Nov. 6, 1928.

R. A. HEISING 1,690,226

PLURAL PHASE GENERATION OR OTHER SYSTEM

Filed Aug. 7. 1920

Inventor:
Raymond A. Heising.
by C. C. Sprague. Atty.

Patented Nov. 6, 1928.

1,690,226

UNITED STATES PATENT OFFICE.

RAYMOND A. HEISING, OF EAST ORANGE, NEW JERSEY, ASSIGNOR TO WESTERN ELECTRIC COMPANY, INCORPORATED, OF NEW YORK, N. Y., A CORPORATION OF NEW YORK.

PLURAL-PHASE GENERATION OR OTHER SYSTEM.

Application filed August 7, 1920. Serial No. 401,889.

This invention relates to oscillation generators of the type wherein electron discharge devices are arranged to convert direct current energy supplied thereto into oscillatory currents.

An object of the invention is to provide improved methods of and means for the production of multiphase electrical current of radio frequency.

A further object is to provide a polyphase space discharge generator system for producing polyphase currents of any desired number of phases and of either high or low frequency.

The invention also comprehends methods of and means for producing polyphase currents of suitable frequency, uniformity, and purity of wave form for use in signaling, distant control, synchronizing, or other systems.

The invention also comprehends new and improved means and systems for the production of balanced three-phase currents, unbalanced three-phase currents, three-phase currents wherein two of the phases are in quarter phase relation, two phases of current in phase opposition, and other polyphase currents of either high or low frequency. The term "high frequency" as used herein is intended to include currents of those frequencies used or capable of practical use in electro-magnetic wave radiating systems, while "low frequency" is applied to waves of all lower frequencies.

The specific embodiment of the invention described herein comprises a plurality of separate thermionic oscillation generators symmetrically connected to a closed loop. When so connected and adjusted to the same frequency the oscillators produce a plural phase voltage across the several branches of the loop.

Figure 1:
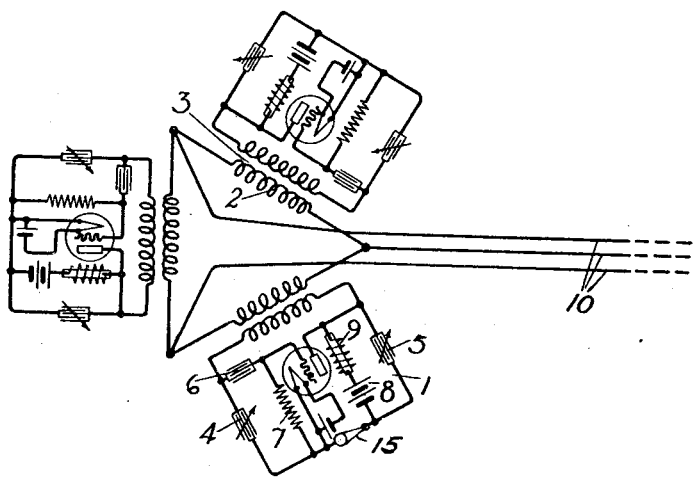
Figure 2:
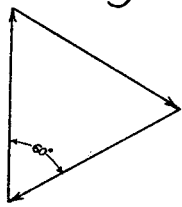
Figure 3:
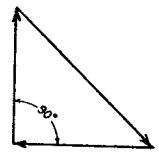
Figure 4:
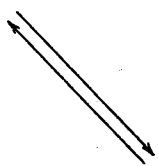
Figure 5:
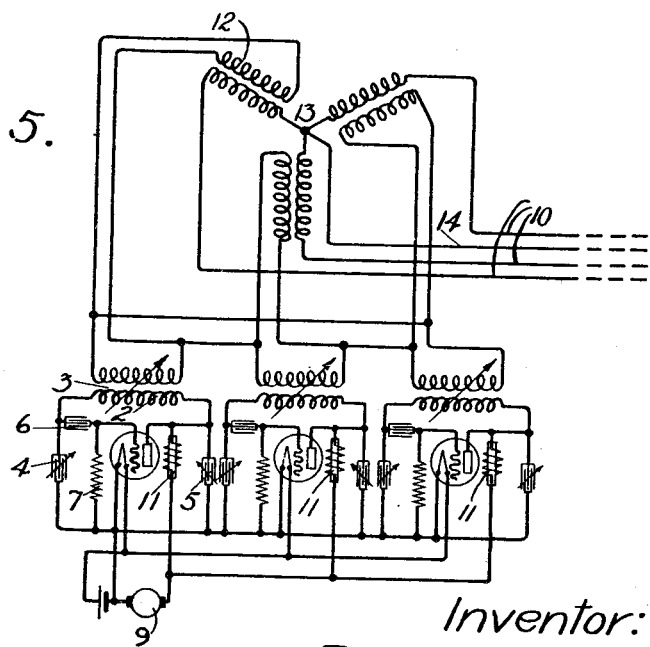

The invention is more particularly described in connection with the accompanying drawings wherein Fig. 1 is a circuit diagram illustrating the invention; Figs. 2, 3 and 4 are vector diagrams illustrating the various relations which may exist between the voltages and currents in the system of Fig. 1; and Fig. 5 is a three-phase system similar to that of Fig. 1 but having the space current supplied for all the oscillators drawn from a common source and having a three-phase transformer system for applying the generated energy to a transmission line.

In Fig. 1, three separate tube oscillators deliver power to a closed delta or loop circuit 2 to which they are similarly and equally coupled by means of transformers 3, whose primaries are in the tuned circuits of the oscillators and whose secondaries are included in the delta. Each oscillator comprises an electron-discharge device of the ordinary or any suitable type having a heated filamentary electron emitting cathode, an anode, and a space discharge controlling element in the form of a grid. A tuned frequency determining circuit comprising the primary of a transformer 3 and capacities 4 and 5 is coupled to the discharge tube for the generation of oscillations, the cathode being connected between the capacities 4 and 5, while the anode and the grid are connected to their other terminals respectively. The usual stopping condenser 6, leak path 7, current supply source 8 and choke coil 9 are provided, current fed into the oscillatory circuit causing corresponding potentials to be impressed on the grid owing to the feed-back connections. This type of generator, being well-known in the art, needs no further description.

It has been found that when three such generators are adjusted to approximately the same frequency and approximately the same amplitude of oscillations and then connected to a closed delta, such as the delta of Fig. 2, they fall into step, so to speak, and act as a three-phase generator. The voltages across the three arms of the closed delta circuit will be exactly or approximately equal and exactly or approximately 120° apart and may be made more nearly so by readjustment, if necessary, of the tuning condensers or other elements of the oscillators. In order to make the generators divide the load equally, it may be necessary to so adjust the tuning of their oscillatory circuits that they will not have exactly the same frequency if the delta is opened. Power can be drawn from the system by any suitable arrangement, such as, for example, by the three-phase circuit 10 connected to the several angles of the delta.

Fig. 2 is a vector diagram of the voltages across the three secondaries of the transformers 3. Assume now that the system is operating and that the space current of two of the generators is gradually and equally reduced until the alternating voltages impressed on the delta by each have a value of $\frac{1}{\sqrt{2}}$ times that induced in the third transformer secondary; then the vector diagram of the voltages will be represented by Fig. 3. It will be noted that in this case two of the phases are in quadrature. This forms a convenient source of alternating currents of any desired frequency having two phases, 90° apart. Since lowering the plate current reduces the efficiency of the oscillator the dissipation of energy in the circuit may cause the oscillations to cease. In this case it may be necessary to provide additional tubes in parallel in each oscillator to maintain the oscillations.

If one of the generators represented in Fig. 1 be stopped, as by opening the switch 15, or removed from the system, then the voltages induced in the closed loop by the other two will come into phase opposition or approximately so, as represented by the vector diagram of Fig. 4.

It will be seen that the invention is not limited in application to three-phase systems but the principle thereof may be employed for generating currents of any number of phases desired such as five or six phases. This is accomplished by connecting in a closed loop as many coils 2 as the required number of phases and coupling one thermionic oscillation generator circuit to each coil. Furthermore, by unbalancing such systems in various ways, the currents produced may be induced to have a variety of non-symmetrical phase relations. In case currents of relatively low frequency are desired, then the transformers 3 may have magnetic cores and large condensers 4 and 5 may be used. If radio frequencies are desired, however, the transformers 3 will be of the type usually employed in radio frequency work and the condensers 4 and 5 will be proportionately small.

In Fig. 5 is illustrated a system similar to that of Fig. 1 and having corresponding elements correspondingly characterized. The source 9 provides space current for all the tubes of the system. Choke coils 11 prevent alternating current of the frequency being generated by the tubes from passing through the circuit of the source 9. Across the secondary of each transformer 3 is connected one primary 12 of a three-phase transformer system 13, connected to a load circuit or transmission line 10 having a neutral branch 14. This illustrates how the current derived from a polyphase generating system of the type described may be transformed before application to a load circuit for utilization.

The novel features inherent in the invention are defined in the appended claims.

What is claimed is:

1. A system for the generation of multi-phase current, comprising a plurality of space discharge generators and a closed loop circuit similarly associated with said generators.

2. A generator of multiphase alternating current, comprising a plurality of electron discharge devices, appropriate circuit arrangements connected thereto whereby said devices function as generators of alternating current, and a phase maintaining load circuit similarly associated with said generators.

3. A radio frequency transmission system comprising a three wire conductor system, a high frequency transformer system having coils connecting the conductors of the conductor system in pairs, and a space discharge system for setting up radio frequency oscillations approximately 120° out of phase with each other in said coils.

4. A polyphase generator of radio frequency current including a conductor system having a closed loop conductive to radio frequency currents of the frequency to be generated, thermionic generators connected to the loop, and equal in number to the desired number of phases, and means constituting a part of said generators and separate from the loop for approximately synchronizing said generators.

5. A polyphase generator of current, comprising a plurality of space discharge oscillation generators, a closed loop circuit, and a transformer connecting each of said generators to said circuit.

6. A system for the generation of polyphase alternating current, comprising a plurality of discharge devices each having an electron-emitting cathode, an anode and a discharge controlling element, an output circuit connected to said anode, a feed-back circuit connected to said element, a tuned loop circuit associated with said output and feed-back circuits, a multiple conductor load circuit, and a polyphase transformer system connecting said tuned circuits and said load circuit.

7. A system for converting direct current power into polyphase alternating current power comprising a plurality of electrostatically controlled valves exceeding two, means for regeneratively controlling said valves and means maintaining said valves in synchronism and in polyphase relation.

8. A system for converting direct current power into polyphase alternating current power comprising three electrostatically and regeneratively controlled valve converters each associated with a circuit element, said circuit elements being connected together to constitute a closed synchronizing circuit.

9. In a system for converting direct current power into polyphase alternating current power, the combination of three electro statically controlled valve oscillators, each including a primary coil in its circuit, and three secondary coils coupled one to each of said primary coils and connected together to constitute a closed synchronizing circuit.

10. In a system for converting direct current power into polyphase alternating current power, a valve converter comprising electrostatically and regeneratively controlled valves connected in symmetrical circuit arrangement and means maintaining said valves in synchronism and in polyphase relation.

11. The method of converting direct current power by an electrostatically and regeneratively controlled valve converter into polyphase alternating current power at voltages which are substantially independent of the magnitude and distribution of the load, which comprises associating the valves of said converter with independent single phase circuits in such manner as to obtain output alternating voltages of substantially fixed magnitude and associating said circuits in such manner as to maintain said voltages in synchronism and in polyphase relation.

12. A system for the generation of three-phase current comprising a plurality of space discharge generators and a closed loop circuit similarly associated with said generators.

13. A generator of three-phase alternating current comprising a plurality of electron discharge devices, appropriate circuit arrangements connected thereto, whereby said devices function as generators of alternating current, and a phase maintaining load circuit similarly associated with said generators.

14. A three-phase generator of current comprising a plurality of space discharge oscillation generators, a closed loop circuit, and a transformer connecting each of said generators to said circuit.

15. A system for the generation of three-phase alternating current comprising a plurality of discharge devices each comprising an electron-emitting cathode, an anode and a discharge controlling element, an output circuit connected to said anode, a feed back circuit connected to said element, and a tuned loop circuit associated with said output and feed back circuits, a multiple conductor, a load circuit, and a polyphase transformer circuit connecting the tuned circuits of said discharge devices and said load circuit.

16. A system for the generation of plural phase current comprising a plurality of electric discharge generators, and means for associating said generators to maintain them in synchronism and in the desired plural phase relation.

17. A system for the generation of plural phase current comprising electric discharge generators equal in number to the desired number of phases, and means for associating said generators to mtaintain them in synchronism and in the desired plural phase relation.

In witness whereof, I hereunto subscribe my name this 4th day of August, A. D. 1920.

RAYMOND A. HEISING.